(12) United States Patent
Hashimoto

(10) Patent No.: US 11,605,504 B2
(45) Date of Patent: Mar. 14, 2023

(54) MULTILAYER ELECTRONIC COMPONENT AND METHOD FOR MANUFACTURING MULTILAYER ELECTRONIC COMPONENT

(71) Applicant: Murata Manufacturing Co., Ltd., Nagaokakyo (JP)

(72) Inventor: Hideyuki Hashimoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 86 days.

(21) Appl. No.: 16/909,122

(22) Filed: Jun. 23, 2020

(65) Prior Publication Data

US 2020/0411248 A1 Dec. 31, 2020

(30) Foreign Application Priority Data

Jun. 28, 2019 (JP) .............................. JP2019-121521
May 22, 2020 (JP) .............................. JP2020-089481

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/008* (2013.01); *H01G 4/012* (2013.01); *H01G 4/1227* (2013.01); *H01G 4/248* (2013.01)

(58) Field of Classification Search
CPC .......... H01G 4/30; H01G 4/008; H01G 4/012; H01G 4/1227; H01G 4/33; H01G 4/248
See application file for complete search history.

(56) References Cited

U.S. PATENT DOCUMENTS 3,920,781 A 11/1975 Eror et al.
9,287,046 B2 3/2016 Morita et al.
(Continued)

FOREIGN PATENT DOCUMENTS

CN 1634800 A 7/2005
CN 101765894 A 6/2010
(Continued)

OTHER PUBLICATIONS

Definition-of-divalent-cation_Helmenstine_1 page_May 2019.
(Continued)

*Primary Examiner* — Michael P McFadden
(74) *Attorney, Agent, or Firm* — ArentFox Schiff LLP

(57) ABSTRACT

A multilayer electronic component includes a multilayer body including a plurality of stacked dielectric layers and a plurality of internal electrode layers between adjacent dielectric layers of the plurality of stacked dielectric layers. The plurality of stacked dielectric layers each have a plurality of crystal grains including a first phase. The multilayer body defines an electrode facing portion where the plurality of internal electrode layers and the plurality of stacked dielectric layers face each other, and defines an external peripheral portion surrounding the electrode facing portion. A portion of the plurality of stacked dielectric layers in the external peripheral portion include, in at least some of grain boundaries of the plurality of crystal grains, a second phase including at least one of Sn, Cu, Fe, Ni, Cr, Mn, V, Al, and P, and the second phase is a different compound from the first phase.

17 Claims, 14 Drawing Sheets

(51) Int. Cl.
*H01G 4/12* (2006.01)
*H01G 4/008* (2006.01)
*H01G 4/248* (2006.01)

(56) References Cited

U.S. PATENT DOCUMENTS

| | | | |
|---|---|---|---|
| 10,147,546 B2 | 12/2018 | Morita et al. | |
| 2004/0233612 A1* | 11/2004 | Sugimoto | H01G 4/30 361/312 |
| 2009/0086407 A1 | 4/2009 | Takahashi et al. | |
| 2009/0219666 A1* | 9/2009 | Fukuda | C04B 35/62805 501/137 |
| 2009/0225494 A1 | 9/2009 | Yamazaki | |
| 2010/0014214 A1 | 1/2010 | Yamazaki et al. | |
| 2010/0188797 A1 | 7/2010 | Yamazaki et al. | |
| 2012/0250221 A1 | 10/2012 | Yamashita | |
| 2013/0094121 A1 | 4/2013 | Endo et al. | |
| 2015/0036264 A1 | 2/2015 | Morita | |
| 2016/0217924 A1 | 7/2016 | Morita et al. | |
| 2017/0365410 A1 | 12/2017 | Morita et al. | |
| 2018/0182557 A1* | 6/2018 | Park | H01L 28/40 |
| 2018/0294098 A1 | 10/2018 | Inoue | |
| 2019/0051460 A1* | 2/2019 | Kawamura | H01G 4/30 |
| 2019/0198245 A1* | 6/2019 | Sanner | C04B 35/634 |
| 2019/0233948 A1 | 8/2019 | Wang et al. | |
| 2019/0272954 A1* | 9/2019 | Ariga | H01G 4/012 |
| 2020/0043665 A1* | 2/2020 | Park | H01G 4/1227 |
| 2020/0090865 A1* | 3/2020 | Kim | H01G 4/0085 |
| 2020/0258684 A1 | 8/2020 | Yun et al. | |

FOREIGN PATENT DOCUMENTS

| | | |
|---|---|---|
| CN | 103553591 A | 2/2014 |
| JP | 2001143957 A | 5/2001 |
| JP | 2003142331 A | 5/2003 |
| JP | 2005029423 A | 2/2005 |
| JP | 2008109120 A | 5/2008 |
| JP | 2010171108 A | 8/2010 |
| JP | 2013026507 A | 2/2013 |
| JP | 2013102123 A | 5/2013 |
| JP | 2013157460 A | 8/2013 |
| JP | 2013229551 A | 11/2013 |
| JP | 2017228590 A | 12/2017 |
| JP | 2018181940 A | 11/2018 |
| KR | 1020090011028 A | 1/2009 |
| KR | 1020090033099 A | 4/2009 |
| KR | 20120080657 A | 7/2012 |
| KR | 20130040708 A | 4/2013 |

OTHER PUBLICATIONS

Rare Earth Elements Ionic Radius_Shannon_p. 1_1976.
Structure & Dielectric Properties of Perovskite BaTiO3_Hsiao-Lin_ pp. 1-15_Dec. 2002.
Korean Office Action issued for Korean Application No. 10-2020-0072713, dated Nov. 3, 2021.
Korean Office Action issued for Korean Application No. 10-2020-0075437, dated Nov. 24, 2021.
Korean Office Action issued for Korean Application No. 10-2020-0076266, dated Nov. 24, 2021.
BariumTitanate_pp. 49 to 104_1999.
Gong, H. et al.; "Interfacial Diffusion Behavior In Ni—BaTiO3 MLCCs with Ultra-Thin Active Layers"; Electron. Mater. Lett., vol. 10, No. 2 (2014), pp. 417-421.
Li, L, et al.; "Synthesis & Characterization of X8R BaTiO3-based dielectric ceramics by doping with NiNb2O6 nanopowders"; J Mater Sci: Mater Electron (2015) 26: pp. 9522-9528.
Dionot, J.; "Topology of Ferroelectric Polarization at the BaTiO3 (001) surface from ab initio calculations and electron microscopy-spectroscopy";pp. 1-154_Dec. 2015.
Oyama, T et al.; "Trapping of oxygen vacancy at grain boundary and its correlation with local atomic configuration and resultant excess energy in barium titanate: A systematic computational analysis"; Physical Review B 82, (2010), pp. 134107-1 to 134107-10.
Chinese Office Action issued for Chinese Application No. 202010583658.5, dated Aug. 4, 2021.
Wu, Wanghua et al.; "Thermally stimulated depolarization current study on barium titanate single crystals"; AIP Advances, 8, 045005-1 to 045005-6, Apr. 2018.
Lee, Jae-Young et al.; "Coating BaTiO3 Nanolayers on Spherical Ni Powders for Multilayer Ceramic Capacitors" Advanced Materials, Oct. 2003, 15, No. 19, pp. 1655-1658.
Barium Titanate_pp. 49 to 104_Sep. 2007.

* cited by examiner

MULTILAYER ELECTRONIC COMPONENT AND METHOD FOR MANUFACTURING MULTILAYER ELECTRONIC COMPONENT

CROSS REFERENCE TO RELATED APPLICATIONS

The present application claims priority to Japanese Patent Application No. 2019-121521, filed Jun. 28, 2019, and claims priority to Japanese Patent Application No. 2020-089481, filed May 22, 2020, the entire contents of each of which are incorporated herein by reference.

BACKGROUND OF THE INVENTION

Field of the Invention

The present disclosure relates to a multilayer electronic component and a method for manufacturing a multilayer electronic component.

Description of the Background Art

Multilayer electronic components such as a multilayer ceramic capacitor applied to in-vehicle equipment are required to have high mechanical strength. The mechanical strength as referred to herein refers to a load which leads to fracture in a flexural strength test described hereinafter (hereinafter also simply referred to as flexural strength).

As an example of a multilayer electronic component, there is a multilayer ceramic capacitor described in Japanese Patent Laying-Open No. 2018-181940. Japanese Patent Laying-Open No. 2018-181940 discloses a technique for enhancing a multilayer ceramic capacitor in flexural strength by enhancing an internal electrode layer in strength.

SUMMARY OF THE INVENTION

The multilayer ceramic capacitor includes a multilayer body including a plurality of stacked dielectric layers and a plurality of internal electrode layers. The multilayer body has an electrode facing portion in which the plurality of internal electrode layers face one another with a dielectric layer interposed therebetween, and an external peripheral portion surrounding the electrode facing portion. While it is believed that the external peripheral portion's strength has a significant effect on flexural strength, Japanese Patent Laying-Open No. 2018-181940 is silent on enhancing the external peripheral portion's strength.

An object of the present disclosure is to provide a multilayer electronic component having high flexural strength and a method for manufacturing the same.

A multilayer electronic component according to the present disclosure includes a multilayer body including a plurality of stacked dielectric layers and a plurality of internal electrode layers interposed between adjacent dielectric layers of the plurality of stacked dielectric layers. The plurality of stacked dielectric layers each have a plurality of crystal grains including a first phase. The multilayer body defines an electrode facing portion where the plurality of internal electrode layers and the plurality of stacked dielectric layers face each other in a stacking direction of the multilayer body, and defines an external peripheral portion surrounding the electrode facing portion. A portion of the plurality of stacked dielectric layers in the external peripheral portion include, in at least some of grain boundaries of the plurality of crystal grains, a second phase including at least one of Sn, Cu, Fe, Ni, Cr, Mn, V, Al, and P, and the second phase is a different compound from the first phase.

A method for manufacturing a multilayer electronic component according to the present disclosure comprises forming a pre-sintered internal electrode layer on a pre-sintered dielectric layer; stacking a plurality of the pre-sintered dielectric layers having the pre-sintered internal electrode layers formed thereon to obtain a pre-sintered multilayer body; immersing the pre-sintered multilayer body in a sol of a compound including at least one of Sn, Cu, Fe, Ni, Cr, Mn, V, Al and P while the pre-sintered multilayer body is in a course of being sintered; and completing a sintering of the pre-sintered multilayer body after immersing the pre-sintered multilayer body in the sol to obtain a multilayer body including a plurality of stacked dielectric layers and a plurality of internal electrode layers interposed between adjacent dielectric layers of the plurality of stacked dielectric layers.

The multilayer electronic component according to the present disclosure can be enhanced in flexural strength. Further, the method for manufacturing a multilayer electronic component according to the present disclosure can manufacture a multilayer electronic component enhanced in flexural strength.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Features of the present disclosure will be described with reference to the drawings. In an embodiment of a multilayer electronic component described below, identical or common components are denoted by the same reference number in the figures and may not be repeatedly described.

—First Embodiment of Multilayer Electronic Component—

A multilayer ceramic capacitor 100 which is a first embodiment of a multilayer electronic component according to the present disclosure will be described with reference to FIGS. 1 to 6.

<Structure of Multilayer Ceramic Capacitor>

Figure 1:
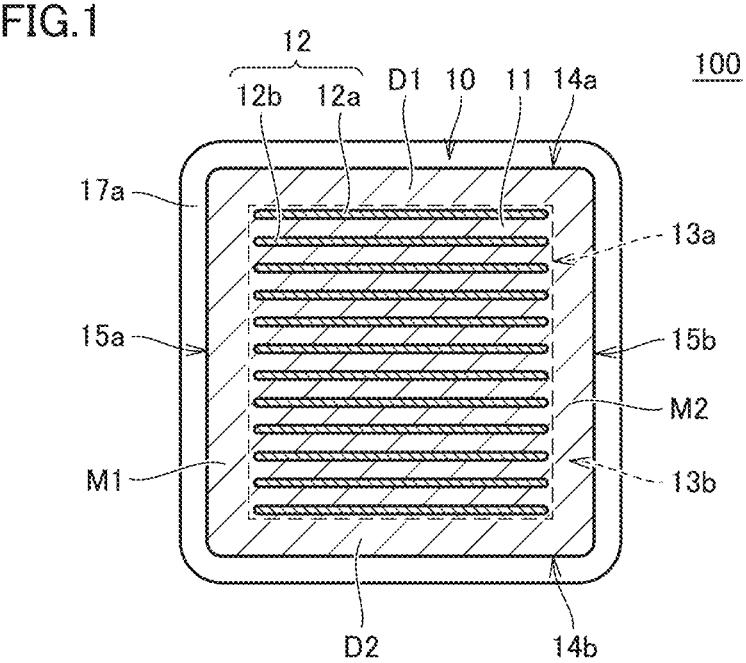
FIG. 1 is a cross section of a center portion in a lengthwise direction of a multilayer ceramic capacitor 100 which is a first embodiment of a multilayer electronic component according to the present disclosure.
Figure 2:
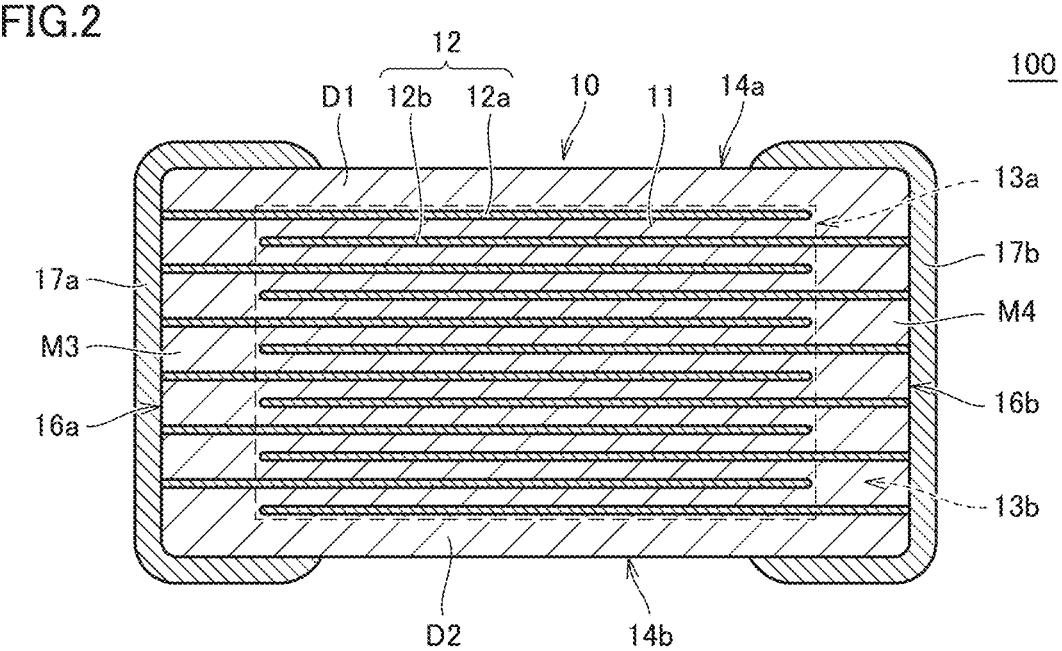
FIG. 2 is a cross section of a center portion in a widthwise direction of multilayer ceramic capacitor 100.

FIGS. 1 and 2 are cross sections of multilayer ceramic capacitor 100. More specifically, FIG. 1 is a cross section of a center portion in a lengthwise direction of multilayer ceramic capacitor 100. FIG. 2 is a cross section of a center portion in a widthwise direction of multilayer ceramic capacitor 100.

Multilayer ceramic capacitor 100 includes a multilayer body 10. Multilayer body 10 includes a plurality of stacked dielectric layers 11 and a plurality of internal electrode layers 12. Multilayer body 10 has a first major surface 14a and a second major surface 14b, a first side surface 15a and a second side surface 15b, and a first end surface 16a and a second end surface 16b. First major surface 14a and second major surface 14b are opposite to each other in a layer stacking direction. First side surface 15a and second side surface 15b are opposite to each other in a widthwise direction orthogonal to the layer stacking direction. First end surface 16a and second end surface 16b are opposite to each other in a lengthwise direction orthogonal to the layer stacking direction and the widthwise direction.

The plurality of dielectric layers 11 are layers composed of a dielectric material. The plurality of dielectric layers 11 each have a plurality of crystal grains having as a component a first phase P1 including a perovskite type compound composed with Ba included therein, as will be described hereinafter with reference to FIG. 8, for example. An example of the perovskite-type compound is for example a perovskite type compound with $BaTiO_3$ as a basic structure.

Internal electrode layer 12 includes an electrically conductive material. Examples of the electrically conductive material for internal electrode layer 12 include at least one type of metal selected from Ni, Ni alloy, Cu, and Cu alloy, or an alloy including the metal. Internal electrode layer 12 may further include dielectric particles called "co-material" as described below. The co-material is added to bring the sintering shrinkability of internal electrode layer 12 closer to the sintering shrinkability of dielectric layer 11 during sintering of multilayer body 10, and a material therefor is not particularly limited as long as it provides the above-mentioned effect.

The plurality of dielectric layers 11 include an outer layer portion and an inner layer portion. The outer layer portion includes a first outer layer portion D1 provided between first major surface 14a of multilayer body 10 and internal electrode layer 12 closest to first major surface 14a, and a second outer layer portion D2 provided between second major surface 14b and internal electrode layer 12 closest to second major surface 14b. The inner layer portion is located in a region sandwiched between first outer layer portion D1 and second outer layer portion D2.

The plurality of internal electrode layers 12 have a first internal electrode layer 12a and a second internal electrode layer 12b. First internal electrode layer 12a has a region facing second internal electrode layer 12b with dielectric layer 11 therebetween, and a lead region reaching first end surface 16a of multilayer body 10. Second internal electrode layer 12b has a region facing first internal electrode layer 12a with dielectric layer 11 therebetween, and a lead region reaching second end surface 16b of multilayer body 10.

In multilayer body 10, a portion in which first internal electrode layer 12a and second internal electrode layer 12b face each other with dielectric layer 11 interposed therebetween will be referred to as an electrode facing portion 13a (a portion surrounded by a broken line in FIGS. 1 and 2).

One capacitor is formed by one first internal electrode layer 12a and one second internal electrode layer 12b facing each other with dielectric layer 11 therebetween. Multilayer ceramic capacitor 100 can be said to be a plurality of capacitors including electrode facing portion 13a and connected in parallel via a first external electrode 17a and a second external electrode 17b, which will be described hereinafter.

Multilayer body 10 includes a first margin portion M1 provided between electrode facing portion 13a and first side surface 15a and a second margin portion M2 provided between electrode facing portion 13a and second side surface 15b. Multilayer body 10 has a third margin portion M3 provided between electrode facing portion 13a and first end surface 16a, and a fourth margin portion M4 provided between electrode facing portion 13a and second end surface 16b. In third margin portion M3, the lead region of first internal electrode layer 12a is disposed. Further, in fourth margin portion M4, the lead region of second internal electrode layer 12b is disposed.

In multilayer body 10, first and second outer layer portions D1 and D2 and first to fourth margin portions M1 to M4 surrounding electrode facing portion 13a will be referred to as an external peripheral portion 13b.

Multilayer ceramic capacitor 100 further includes first external electrode 17a and second external electrode 17b. First external electrode 17a is formed on first end surface 16a so as to be electrically connected to first internal electrode layers 12a. First external electrode 17a extends from first end surface 16a to first major surface 14a, second major surface 14b, first side surface 15a, and second side surface 15b. Second external electrode 17b is formed on second end surface 16b so as to be electrically connected to second internal electrode layer 12b. Second external electrode 17b extends from second end surface 16b to first major surface 14a, second major surface 14b, first side surface 15a, and second side surface 15b.

First external electrode 17a and second external electrode 17b have, for example, an underlying electrode layer and a plating layer disposed on the underlying electrode layer. The underlying electrode layer includes, for example, at least one selected from a sintered material layer, a conductive resin layer, and a thin film metal layer.

The sintered material layer is formed by baking a paste including a glass powder and a metal powder, and includes a glass portion and a metal portion. Examples of glass that constitutes the glass portion include $B_2O_3$—$SiO_2$—BaO-based glass and the like. Examples of metal that constitutes the metal portion include at least one type of metal selected from Ni, Cu, Ag and the like, or an alloy including the metal. A plurality of sintered material layers having different components may be formed. In a manufacturing method described below, the sintered material layer may be fired simultaneously with multilayer body 10, or may be baked after multilayer body 10 is fired.

The electrically conductive resin layer includes, for example, electrically conductive particles such as fine metal particles, and a resin portion. Examples of metal that constitutes the fine metal particles include at least one type of metal selected from Ni, Cu, Ag and the like, or an alloy including the metal. Examples of resin that constitutes the resin portion include an epoxy-based thermosetting resin and the like. A plurality of electrically conductive resin layers having different components may be formed.

The thin film metal layer is formed by, for example, a thin film forming method such as sputtering or vapor deposition, and is a layer having a thickness of not more than 1 μm and having fine metal particles deposited thereon. Examples of metal that constitutes the thin film metal layer include at least one type of metal selected from Ni, Cu, Ag, Au and the like, or an alloy including the metal. A plurality of thin film metal layers having different components may be formed.

Examples of metal that constitutes the plating layer include at least one type of metal selected from Ni, Cu, Ag, Au, Sn and the like, and an alloy including the metal. A plurality of plating layers having different components may be formed. The plating layer is preferably composed of a Ni-plating layer and a Sn-plating layer. The Ni-plating layer can prevent the underlying electrode layer from being eroded by solder when the multilayer electronic component is mounted. The Sn-plating layer has good wettability to solder including Sn, and can improve the mountability when the multilayer electronic component is mounted.

Each of first external electrode 17a and second external electrode 17b may be a plating layer directly provided on multilayer body 10 and directly connected to the above-described corresponding internal electrode layers. The plating layer preferably includes a first plating layer and a second plating layer provided on the first plating layer.

Examples of metal that constitutes the first plating layer and the second plating layer include at least one type of metal selected from Cu, Ni, Sn, Au, Ag, Pd, Zn and the like, or an alloy including the metal. For example, when Ni is used as the metal that constitutes internal electrode layers 12, Cu having good bondability to Ni is preferably used as the metal that constitutes the first plating layer. When Sn or Au is used as the metal that constitutes internal electrode layers 12, a metal having solder barrier performance is preferably used as the metal that constitutes the first plating layer. In addition, Ni having good wettability to solder is preferably used as the metal that constitutes the second plating layer.

<Fine Structure of External Peripheral Portion>

Figure 8:
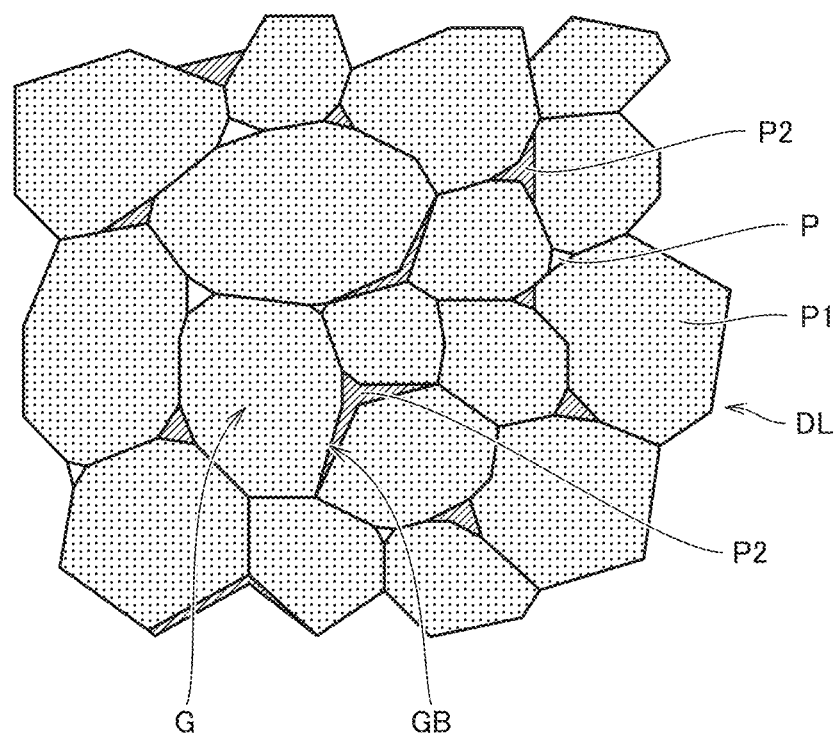
FIG. 8 is an enlarged schematic diagram of an SEM observed image in region R4 of the center portion in the lengthwise direction of multilayer body 10.

External peripheral portion 13b of multilayer ceramic capacitor 100 has, as a basic structure, a plurality of crystal grains including as a component thereof a first phase P1 including a perovskite type compound composed with Ba included therein, as will be described hereinafter with reference to FIG. 8. In addition, external peripheral portion 13b further has in at least some of grain boundaries GB of a plurality of crystal grains G, a second phase P2 that includes at least one of Sn, Cu, Fe, Ni, Cr, Mn, V, Al and P and is different from the first phase P1, as will be described hereinafter with reference to FIG. 8.

In order to investigate the fine structure of external peripheral portion 13b, SEM observation and wavelength dispersive X-ray analysis (hereinafter also referred to as WDX analysis) were conducted. In this investigation, for dielectric layer 11, a dielectric material including $BaTiO_3$ as a basic structure of a perovskite type compound and having a variety of types of additives added thereto was used.

Figure 3:
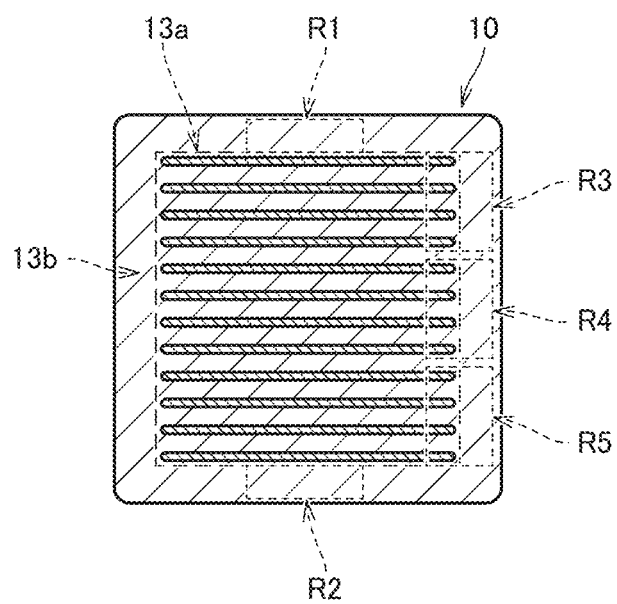
FIG. 3 is a cross section of a center portion in a lengthwise direction of a multilayer body 10 of multilayer ceramic capacitor 100 for illustrating a method for investigating a fine structure of an external peripheral portion 13b of multilayer body 10.
Figure 4:
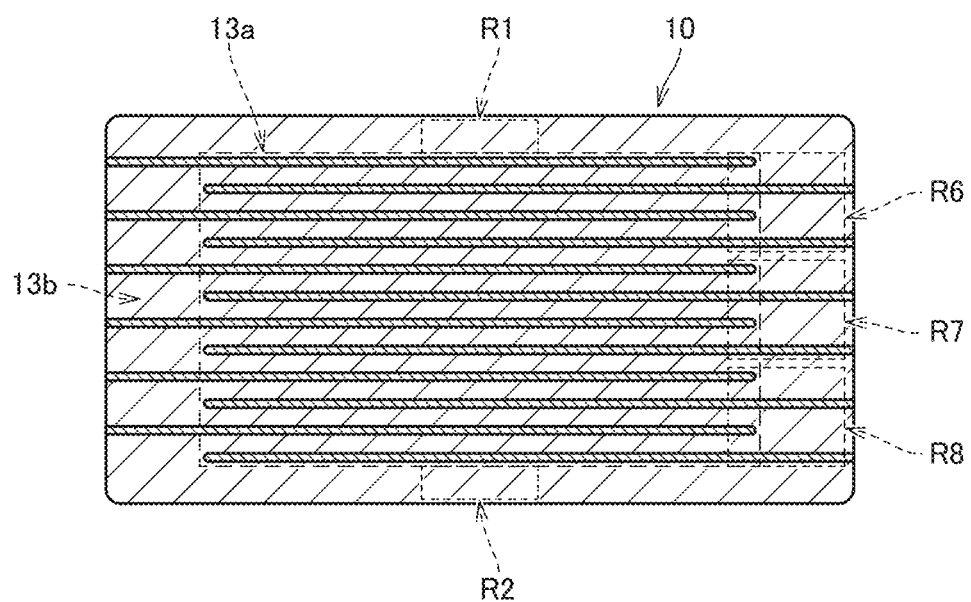
FIG. 4 a cross section of a center portion in a widthwise direction of multilayer body 10.

A method for investigating the fine structure of external peripheral portion 13b of multilayer body 10 of multilayer ceramic capacitor 100 will be described with reference to FIGS. 3 and 4. FIG. 3 is a cross section of a center portion in a lengthwise direction of multilayer body 10 for illustrating a sample for the SEM observation and WDX analysis. FIG. 4 is a cross section of a center portion in a widthwise direction of multilayer body 10 for the same purpose.

Multilayer body 10 of multilayer ceramic capacitor 100 was obtained according to a manufacturing method described hereinafter. As shown in FIG. 3, multilayer body 10 was polished on the side of second end surface 16b to expose the center portion of multilayer body 10 in the lengthwise direction. Further, as shown in FIG. 4, multilayer body 10 was polished on the side of second side surface 15b to expose the center portion of multilayer body 10 in the widthwise direction.

In the cross section of multilayer body 10 at the center portion in the lengthwise direction, a region R1 of first outer layer portion D1 located at a center portion in the widthwise direction and a region R2 of second outer layer portion D2 located at a center portion in the widthwise direction are set as observation regions. Furthermore, in the cross section of multilayer body 10 at the center portion in the lengthwise direction, a region including second margin portion M2 and electrode facing portion 13a is assumed, and the region is divided into three equal portions in the layer stacking direction, and in the figure, these portions were set as an upper region R3, a center region R4, and a lower region R5 as observation regions.

Then, in the cross section of multilayer body 10 at the center portion in the lengthwise direction, a region including fourth margin portion M4 and electrode facing portion 13a is assumed and the region is divided into three equal portions in the layer stacking direction, and in the figure, an upper region R6, a center region R7, and a lower region R8 are set as observation regions. For each observation region of multilayer body 10 set as described above, an observation through an SEM and an elemental analysis through a WDX accompanying the SEM were performed.

Figure 5:
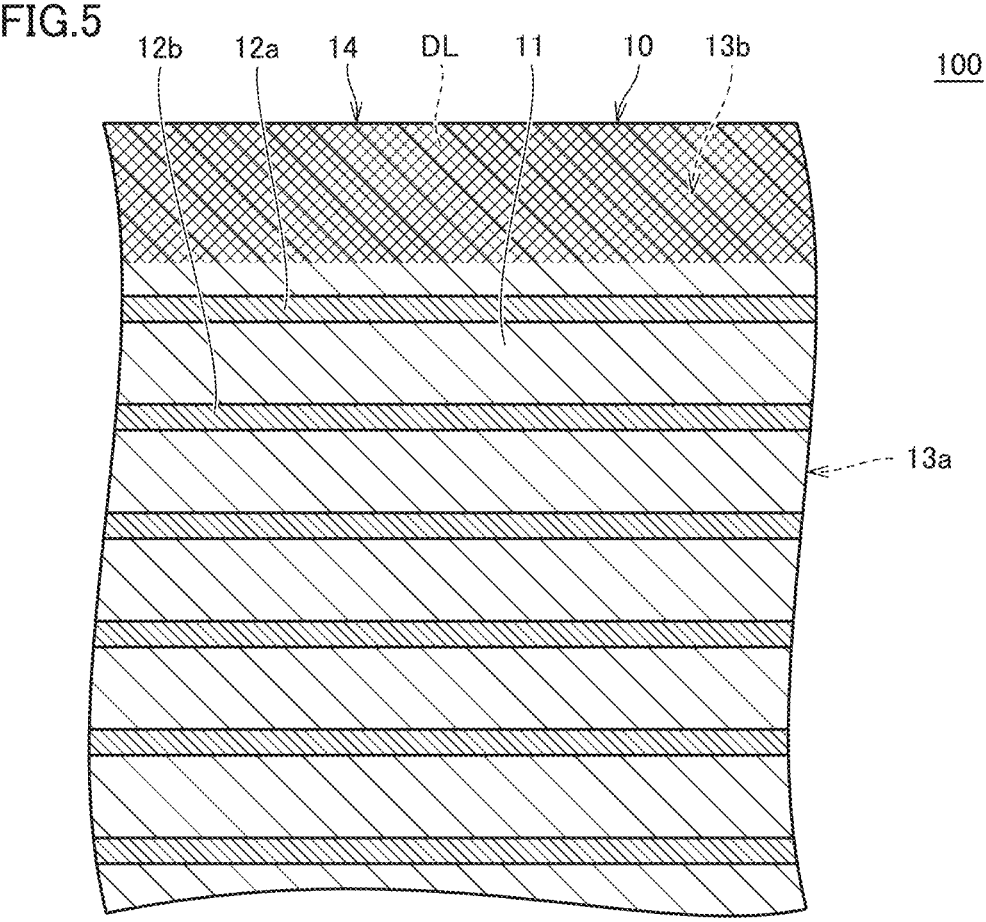
FIG. 5 is a schematic diagram of an image observed with a scanning electron microscope (hereinafter also abbreviated as SEM) in a region R1 of the center portion in the lengthwise direction of multilayer body 10.
Figure 6:
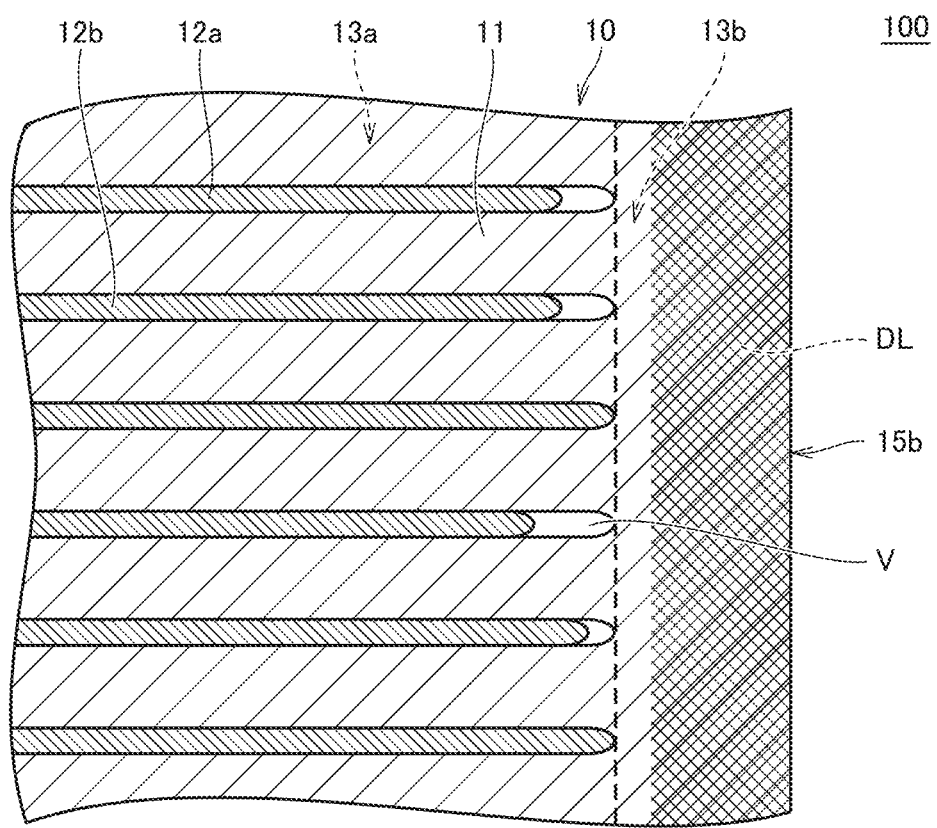
FIG. 6 is a schematic diagram of an SEM observed image in a region R4 of the center portion in the lengthwise direction of multilayer body 10.
Figure 7:
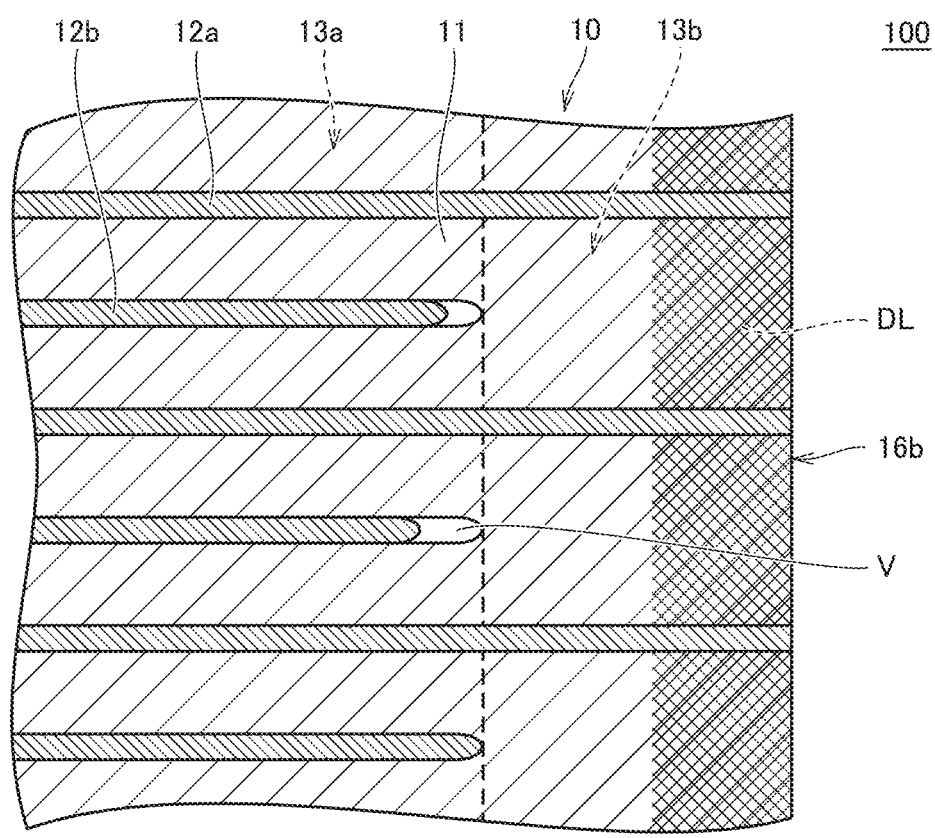
FIG. 7 is a schematic diagram of an SEM observed image in a region R7 of the center portion in the lengthwise direction of multilayer body 10.

FIG. 5 is a schematic diagram of an SEM observed image in region R1 of the center portion in the lengthwise direction of multilayer body 10 shown in FIGS. 3 and 4. FIG. 6 is a schematic diagram of an SEM observed image of region R4. FIG. 7 is a schematic diagram of an SEM observed image of region R7. No significant difference was observed among the SEM observed images and the WDX analysis results in external peripheral portion 13b at regions R1 to R8. Therefore, a result obtained from region R4 as will be described below (see FIG. 6) will be regarded as the fine structure of external peripheral portion 13b in multilayer body 10 of multilayer ceramic capacitor 100 according to the present disclosure.

In external peripheral portion 13b at region R4 there exists from second side surface 15b toward electrode facing portion 13a a layer DL in which a compound including at least one of Sn, Cu, Fe, Ni, Cr, Mn, V, Al, and P is present. In multilayer ceramic capacitor 100, layer DL in which the above compound is present does not reach electrode facing portion 13a. Note that at a tip of first internal electrode layer 12a and that of second internal electrode layer 12b, there may be a vacancy V generated at a time of sintering and shrinking.

Layer DL in which the compound including at least one of Sn, Cu, Fe, Ni, Cr, Mn, V, Al, and P is present will be described with reference to FIG. 8. FIG. 8 is an enlarged schematic diagram of an SEM observed image in region R4 of the center portion in the lengthwise direction of multilayer body 10. In at least some of grain boundaries GB of the plurality of crystal grains G existing in external peripheral portion 13b, a second phase P2 which is composed of a compound including at least one of Sn, Cu, Fe, Ni, Cr, Mn, V, Al and P is present, and is different from a compound of the first phase P1. Herein, the second phase refers to a state in which the compound including at least one of Sn, Cu, Fe, Ni, Cr, Mn, V, Al and P is segregated. In particular, Sn exhibits a role as a sintering aid and is significantly effective.

In the following description, a case where Sn oxide is present as second phase P2 will be described. However, the form of the compound is not limited to an oxide. At least a portion of a component configuring dielectric layer 11 may form a solid solution in the Sn oxide. Grain boundary GB also includes a triple junction. Second phase P2 may be present so as to fill pore P in dielectric layer 11.

Second phase P2 is a compound having a low melting point and plays a role of a sintering aid when multilayer body 10 is fired. That is, second phase P2 present in at least some of grain boundaries GB of the plurality of crystal grains G indicates that external peripheral portion 13b is increasingly sintered. As a result, external peripheral portion 13b can be enhanced in strength, and multilayer ceramic capacitor 100 can be enhanced in flexural strength.

—Second Embodiment of Multilayer Electronic Component—

A multilayer ceramic capacitor 100A that is a second embodiment of the multilayer electronic component according to the present disclosure will be described with reference to FIG. 9.

Figure 9:
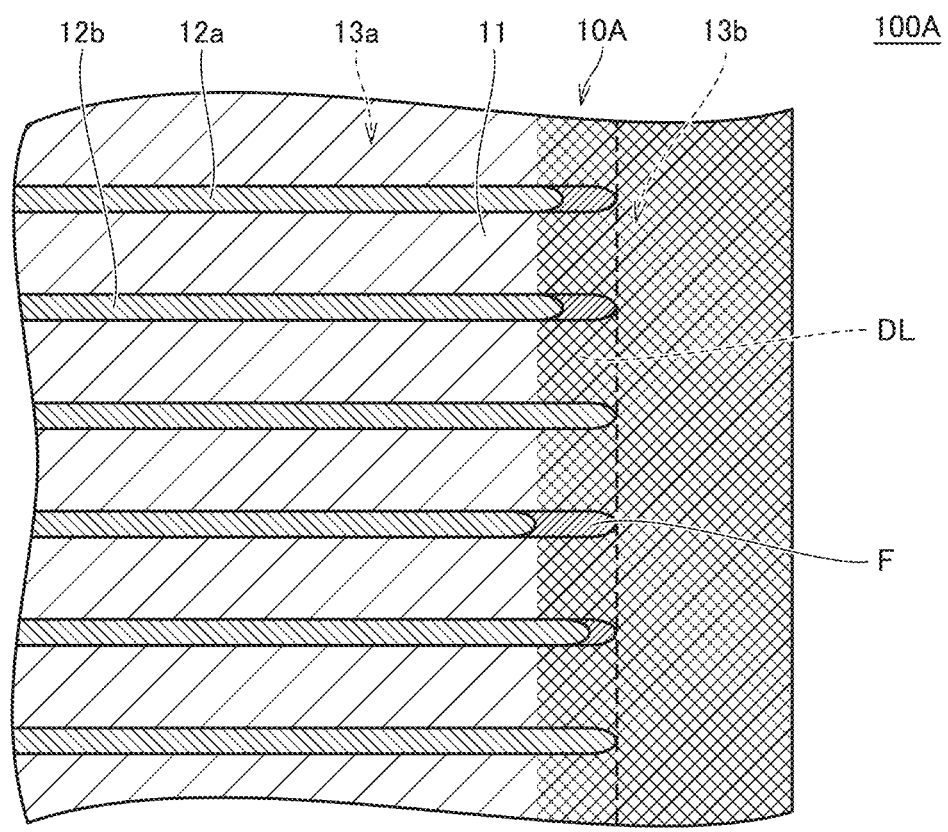
FIG. 9 is a schematic diagram of an SEM observed image in region R4 of a center portion in a lengthwise direction of a multilayer body 10A of a multilayer ceramic capacitor 100A that is a second embodiment of the multilayer electronic component according to the present disclosure.

FIG. 9 is a schematic diagram of an SEM observed image in region R4 of a center portion in a lengthwise direction of a multilayer body 10A of multilayer ceramic capacitor 100A. Multilayer ceramic capacitor 100A is different from multilayer ceramic capacitor 100 in terms of the state of layer DL in which Sn oxide is present and the state of an edge portion of internal electrode layer 12. The remainder in configuration is identical to that of multilayer ceramic capacitor 100, and will not be described in detail.

In multilayer ceramic capacitor 100A, layer DL in which second phase P2 that is Sn oxide is present is generated so as to include external peripheral portion 13b and a portion of electrode facing portion 13a. In the process for forming second phase P2, when internal electrode layer 12 including one of Ni, Ni alloy, Cu and Cu alloy is sintered and shrinks, the Sn oxide enters vacancy V formed at an edge portion of internal electrode layer 12. The Sn oxide having entered vacancy V serves as a Sn filler F to fill at least a portion of vacancy V.

That is, in multilayer ceramic capacitor 100A, Sn is present locally in at least a portion of an edge portion of internal electrode layer 12. An element that is present locally in at least a portion of an edge portion of internal electrode layer 12 is only required to be at least one of Sn, Cu, Fe, Ni, Cr, Mn, V, Al and P.

Multilayer ceramic capacitor 100A also has the second phase P2 playing a role of a sintering aid when multilayer body 10 is fired. As a result, as well as multilayer ceramic capacitor 100, multilayer ceramic capacitor 100A can have external peripheral portion 13b enhanced in strength, and multilayer ceramic capacitor 100A can be enhanced in flexural strength.

Further, multilayer ceramic capacitor 100A has at least a portion of vacancy V located at an edge portion of internal electrode layer 12 filled with filler F and generated at a time of sintering and shrinking. That is, vacancy V is reduced in volume. This can suppress infiltration of moisture at the time of barrel-finishing after firing and when a plating layer included in the external electrode is formed as described above. As a result, migration of metal included in each internal electrode layer can be suppressed, and multilayer ceramic capacitor 100A can thus be enhanced in reliability.

Filler F may be a metal forming internal electrode layer 12 (e.g., Ni) alloyed with the above element or the like to be conductive. Further, filler F may be the above element at least partially reduced while fired in a reducing atmosphere to be conductive. In these cases, filler F can function as a portion of internal electrode layer 12. As a result, each internal electrode layer can have an increased effective area and hence be enhanced in capacitance.

—Third Embodiment of Multilayer Electronic Component—

A multilayer ceramic capacitor 100B that is the third embodiment of the multilayer electronic component according to the present disclosure will be described with reference to FIG. 10.

Figure 10:
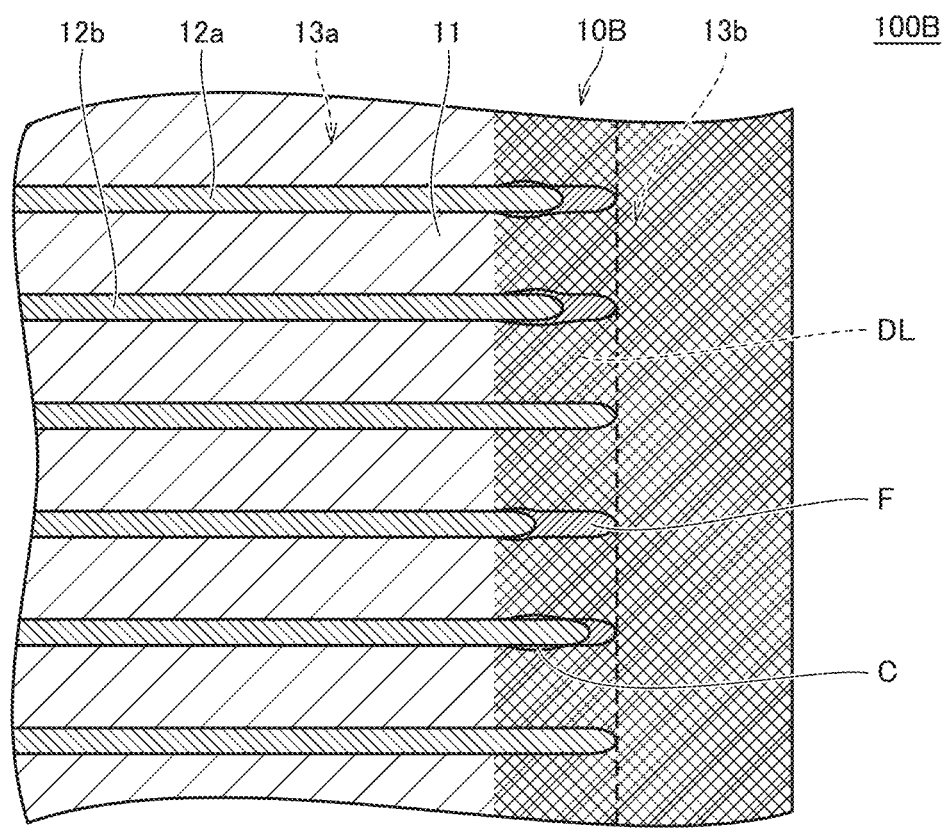
FIG. 10 is a schematic diagram of an SEM observed image in region R4 of a center portion in a lengthwise direction of a multilayer body 10B of a multilayer ceramic capacitor 100B that is a third embodiment of the multilayer electronic component according to the present disclosure.

FIG. 10 is a schematic diagram of an SEM observed image in region R4 of a center portion in a lengthwise direction of a multilayer body 10B of multilayer ceramic capacitor 100B. Multilayer ceramic capacitor 100B is different from multilayer ceramic capacitor 100 in terms of the state of layer DL in which Sn oxide is present and the state of an edge portion of internal electrode layer 12. The remainder in configuration is identical to that of multilayer ceramic capacitor 100, and thus will not be described in detail.

In multilayer ceramic capacitor 100B as well, layer DL in which second phase P2 that is Sn oxide is present is generated so as to include external peripheral portion 13b and a portion of electrode facing portion 13a. In the process for forming second phase P2, when internal electrode layer 12 including one of Ni, Ni alloy, Cu and Cu alloy is sintered and shrinks, the Sn oxide enters vacancy V formed at an edge portion of internal electrode layer 12. The Sn oxide having entered vacancy V serves as a Sn filler F to fill at least a portion of vacancy V. Further, the Sn oxide serves as a coating C to coat at least a portion of an interface of dielectric layer 11 and internal electrode layer 12.

That is, in multilayer ceramic capacitor 100B, Sn is present locally at an edge portion of internal electrode layer 12 and at least a portion of an interface between the edge portion of internal electrode layer 12 and dielectric layer 11. An element present locally at the edge portion of internal electrode layer 12 is only required to be at least one of Sn, Cu, Fe, Ni, Cr, Mn, V, Al and P.

Multilayer ceramic capacitor 100B also has the second phase P2 playing a role of a sintering aid when multilayer body 10 is fired. As a result, as well as multilayer ceramic capacitor 100, multilayer ceramic capacitor 100B can also have external peripheral portion 13b enhanced in strength, and multilayer ceramic capacitor 100B can be enhanced in flexural strength.

In addition, in multilayer ceramic capacitor 100B, at least a portion of vacancy V located at an edge portion of internal electrode layer 12 and generated at a time of sintering and shrinking is filled with filler F. Furthermore, at least a portion of an interface of an edge portion of internal electrode layer 12 and dielectric layer 11 is coated with coating C. As well as multilayer ceramic capacitor 100A, multilayer ceramic capacitor 100B has vacancy V having a volume reduced by filler F. Furthermore, coating C can firmly adhere to at least a portion of the interface of the edge portion of internal electrode layer 12 and dielectric layer 11.

This can further suppress infiltration of moisture at the time of barrel-finishing after firing and when a plating layer included in the external electrode is formed as described above for example. As a result, migration of metal included in each internal electrode layer can further be suppressed, and multilayer ceramic capacitor 100B can thus further be increased in reliability.

Filler F and coating C may be a metal forming internal electrode layer 12 (e.g., Ni) alloyed with the above element or the like to be conductive. Further, filler F and coating C may be the above element at least partially reduced while fired in a reducing atmosphere to be conductive. In these cases, filler F and coating C can function as a portion of internal electrode layer 12.

In particular, when coating C coats an edge portion of internal electrode layer 12 reduced in thickness or having a large number of pores and thus insufficiently functioning as an internal electrode layer, the coating exhibits its effect significantly. As a result, each internal electrode layer can have a further increased effective area and hence be enhanced in capacitance.

—Method for Manufacturing Multilayer Electronic Component—

A method for manufacturing multilayer ceramic capacitor 100B that is the third embodiment of the multilayer electronic component according to the present disclosure will be described in the order of steps for manufacturing the same. Multilayer ceramic capacitor 100 according to the first embodiment and multilayer ceramic capacitor 100A according to the second embodiment differ only in the degree of impregnation with a Sn compound described hereinafter, and can be manufactured in a similar method. Therefore, how multilayer ceramic capacitors 100 and 100A are manufactured will not be described. The method for manufacturing multilayer ceramic capacitor 100B includes the following steps.

The method for manufacturing multilayer ceramic capacitor 100B includes the step of obtaining a plurality of ceramic green sheets by using dielectric raw material powder. The word "green" is an expression representing "pre-sintered" and will be used in that meaning hereinafter. The dielectric raw material powder is, for example, $BaTiO_3$ powder having a surface with a variety of additives added thereto. The ceramic green sheet includes a binder component other than the dielectric raw material powder. The binder component is not particularly limited.

The above-described dielectric raw material powder can be produced, for example, by applying an organic compound of an additive to a surface of a $BaTiO_3$ powder, and calcinating and burning the organic component, to thereby bring about a state in which the additive is applied to the surface of the $BaTiO_3$ powder in an oxide state. However, the dielectric raw material powder is not limited to the above-described state, and may be in a state of including the organic compound, or in a state of including the oxide and the organic compound. The above-described $BaTiO_3$ powder in the dielectric raw material powder may be a $BaTiO_3$ solid solution powder.

The $BaTiO_3$ powder can be obtained, for example, by calcinating a mixture of a $BaCO_3$ powder and a $TiO_2$ powder. Alternatively, a $BaTiO_3$ powder made by a known method such as an oxalic acid method or a hydrothermal synthesis method may be used.

The method for manufacturing multilayer ceramic capacitor 100B includes the step of printing an internal electrode layer pattern on the ceramic green sheet. An internal electrode layer paste for example includes metal powder including one of Ni, a Ni alloy, Cu and a Cu alloy, $BaTiO_3$ powder having a surface with a variety of additives added thereto (i.e., a co-material), and a binder component. Note that the co-material is not essential for the internal electrode layer. The binder component is not particularly limited. Herein, the step of printing the internal electrode layer pattern on the ceramic green sheet corresponds to the step of forming a pre-sintered internal electrode layer on a pre-sintered dielectric layer by using the internal electrode layer paste.

The co-material can be prepared for example as follows: An additive of an organic compound is provided to a surface of $BaTiO_3$ powder and calcinated to combust an organic component so that the additive is provided to the surface of the $BaTiO_3$ powder in the form of an oxide. Note, however, that this is not exclusive, and the co-material may be in a state with an organic compound included or may be in a state with an oxide and an organic compound included. Further, in the co-material, the $BaTiO_3$ powder may be $BaTiO_3$ solid solution powder. The co-material may be the same as or different from the dielectric raw material powder.

The method for manufacturing multilayer ceramic capacitor 100B includes the step of stacking a plurality of ceramic green sheets including a ceramic green sheet with an internal electrode pattern formed thereon to obtain a green multilayer body. This step corresponds to the step of stacking a plurality of pre-sintered dielectric layers including a pre-sintered dielectric layer with a pre-sintered internal electrode layer formed thereon to obtain a pre-sintered multilayer body.

The method for manufacturing multilayer ceramic capacitor 100B includes the step of sintering the green multilayer body to obtain a multilayer body including a plurality of stacked dielectric layers and a plurality of internal electrode layers.

The step of sintering includes a sol immersion step and a sintering step. In the sol immersion step, the pre-sintered multilayer body that is in the course of being sintered in a firing furnace and has a porous state is temporarily ejected from the firing furnace and immersed in a sol of a compound including at least one of Sn, Cu, Fe, Ni, Cr, Mn, V, Al and P. The sintering step is the step of sintering the pre-sintered multilayer body that has been immersed in the sol and is in the course of being sintered.

In the sol immersion step, the pre-sintered multilayer body that is in the course of being sintered in the firing furnace and is has a porous state is heated for example to 800° C. in the firing furnace, held as appropriate, and then cooled to 50° C. or lower and ejected from the firing furnace. Note that the temperatures indicated above are only one example and not exclusive. The ejected pre-sintered multilayer body is immersed in the sol of the compound. The sol of the compound can be a dispersion of an oxide or hydroxide of each element in water.

In the sintering step, the pre-sintered multilayer body with the above compound having entered the multilayer body through an external surface of the multilayer body through the sol immersion step is again introduced into the firing furnace, heated to a temperature allowing the dielectric raw material powder to be sufficiently sintered, and held as appropriate to obtain multilayer body 10. By this sintering step, second phase P2 different from first phase P1 can be formed in at least some of grain boundaries GB of the plurality of crystal grains G including first phase P1 in external peripheral portion 13b.

The step of obtaining a green multilayer body through to the step of obtaining a sintered multilayer body will be described more specifically with reference to FIGS. 11 to 14.

FIGS. 11 to 14 are cross sections showing main parts of a process for manufacturing multilayer body 10B included in multilayer ceramic capacitor 100B that is the third embodiment of the multilayer electronic component according to the present disclosure.

Figure 11:
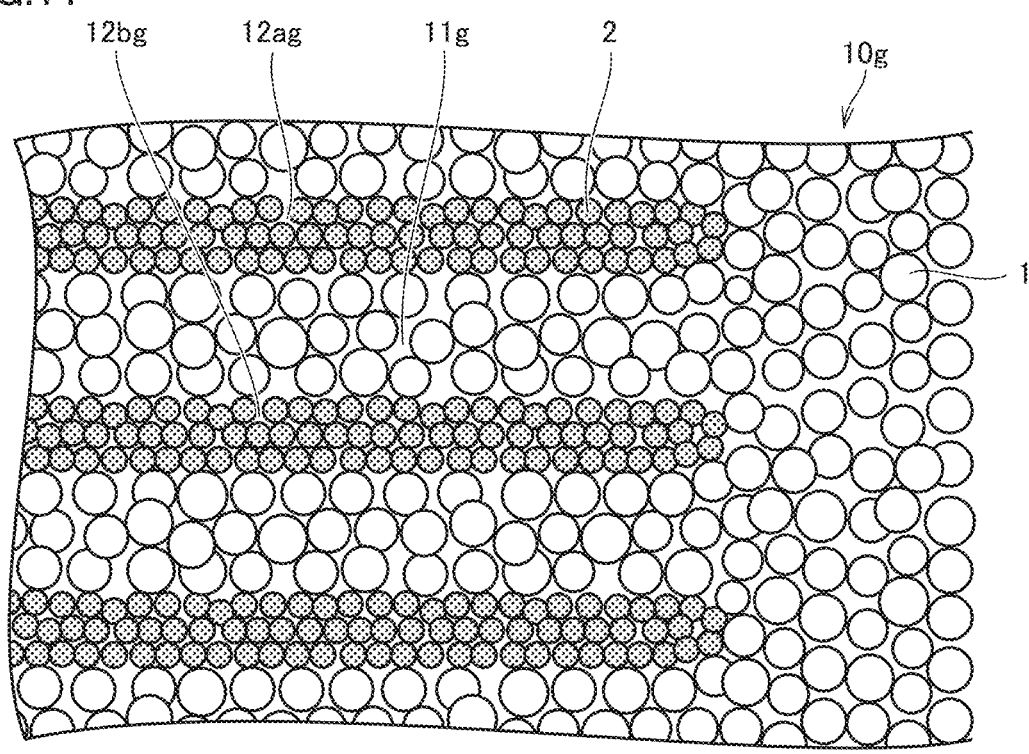
FIG. 11 is a cross section showing the step of obtaining a green multilayer body 10g.

FIG. 11 is a cross section showing the step of obtaining green multilayer body 10g. Green multilayer body 10g is obtained by stacking a ceramic green sheet 11g, a first internal electrode layer pattern 12ag, and a second internal electrode layer pattern 12bg in layers. Ceramic green sheet 11g includes dielectric raw material powder 1 and a binder (not shown). First internal electrode layer pattern 12ag and second internal electrode layer pattern 12bg include Ni-containing metal powder 2 and a binder (not shown) for example.

Figure 12:
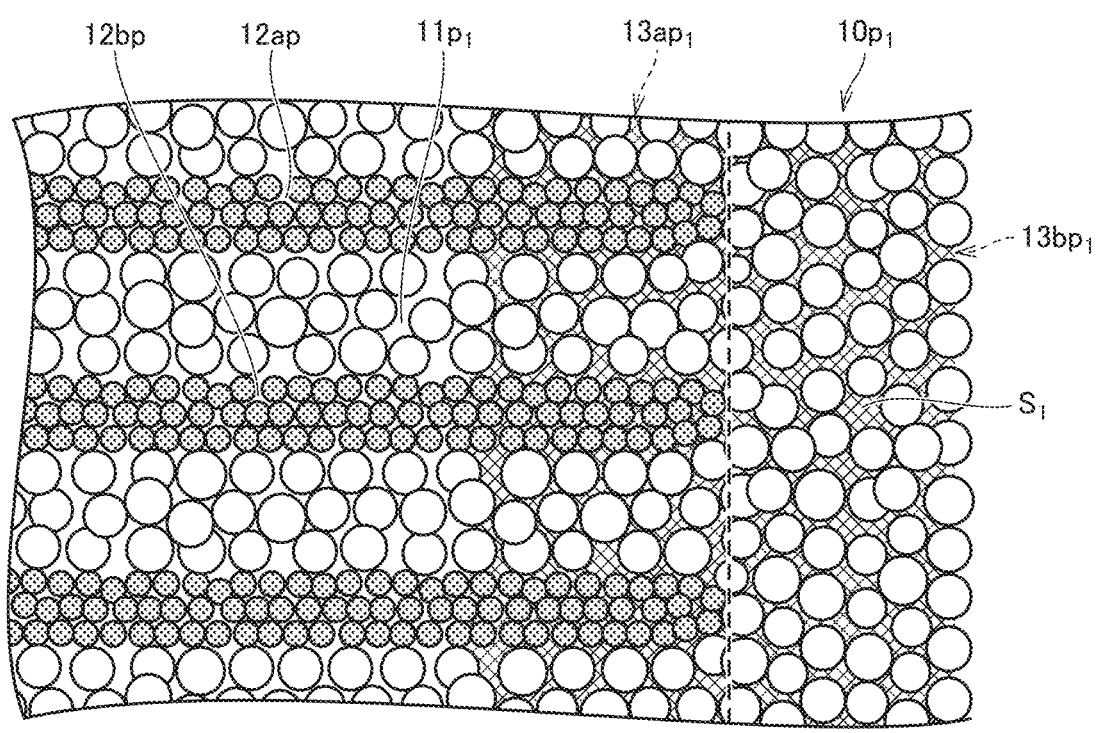
FIG. 12 is a cross section showing green multilayer body 10g heated to be a pre-sintered multilayer body $10p_1$ which is in turn immersed in a Sn compound sol to impregnate an external peripheral portion $13bp_1$ and a portion of an electrode facing portion $13ap_1$ with a Sn compound $S_1$.

FIG. 12 is a cross section showing green multilayer body 10g heated to be a pre-sintered multilayer body $10p_1$ which is in turn immersed in a Sn compound sol for example to impregnate external peripheral portion $13bp_1$ and a portion of electrode facing portion $13ap_1$ with an Sn compound $S_1$. Heating green multilayer body 10g removes the binder included in ceramic green sheet 11g, first internal electrode layer pattern 12ag, and second internal electrode layer pattern 12bg.

That is, pre-sintered multilayer body $10p_1$ includes a porous pre-sintered dielectric layer $11p_1$, and porous first and second pre-sintered internal electrode layer patterns 12ap and 12bp. Pre-sintered multilayer body $10p_1$ is cooled and thereafter once ejected from the firing furnace. Pre-sintered multilayer body $10p_1$ ejected from the firing furnace is immersed in the Sn compound sol. As a result, Sn compound $S_1$ enters external peripheral portion $13bp_1$ and a portion of electrode facing portion $13ap_1$.

Figure 13:
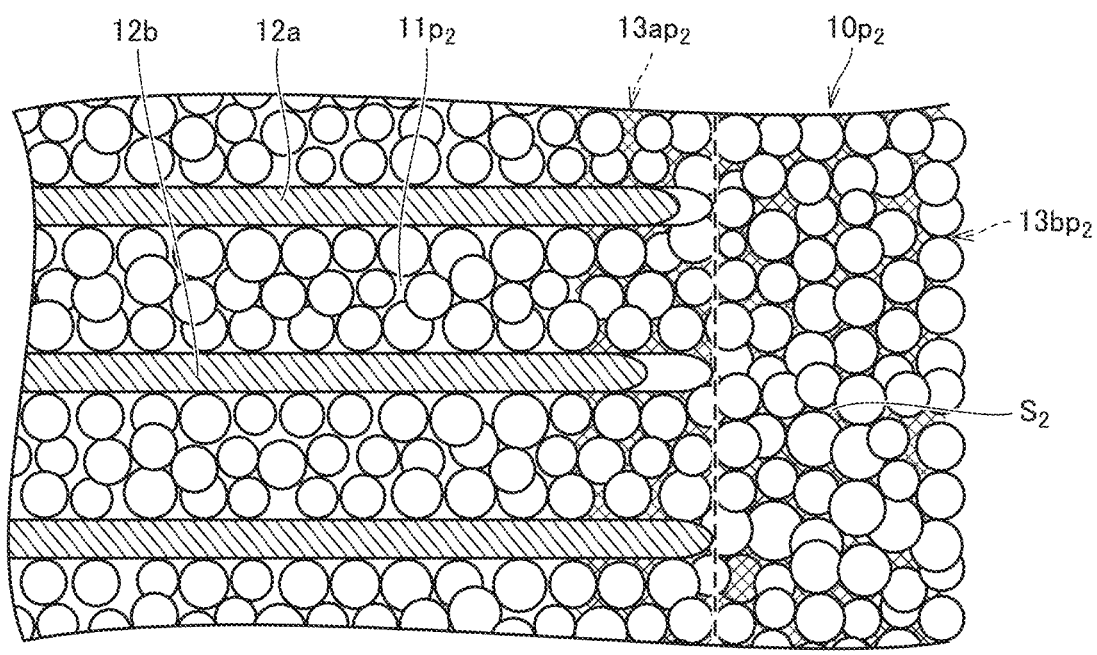
FIG. 13 is a cross section showing the step of further heating pre-sintered multilayer body 10p1 to obtain a semi-sintered multilayer body $10p_2$ having a first internal electrode layer 12a and a second internal electrode layer 12b sintered.

FIG. 13 is a cross section showing the step of further heating pre-sintered multilayer body $10p_1$ to obtain a semi-sintered multilayer body $10p_2$ having first and second internal electrode layers 12a and 12b sintered. Further heating pre-sintered multilayer body $10p_1$ from the temperature at which the binder is removed sinters and shrinks first internal electrode layer 12a and second internal electrode layer 12b and generates pores at an edge portion. Furthermore, pre-sintered dielectric layer $11p_1$ is further sintered to be a semi-sintered dielectric layer $11p_2$.

That is, semi-sintered multilayer body $10p_2$ includes an electrode facing portion $13ap_2$ and an external peripheral portion $13bp_2$ surrounding electrode facing portion $13ap_2$. Electrode facing portion $13ap_2$ is a portion having first internal electrode layer 12a and second internal electrode layer 12b facing each other with semi-sintered dielectric layer $11p_2$ interposed. Further, Sn compound $S_1$ becomes a Sn compound $S_2$ present locally in remaining pores or the like as pre-sintered multilayer body $10p_1$ is further sintered.

Figure 14:
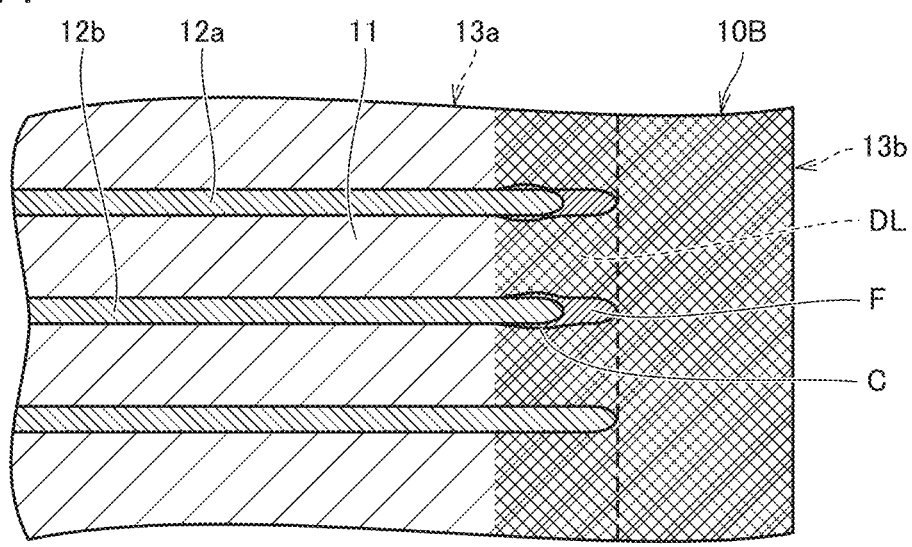
FIG. 14 is a cross section showing the step of further heating semi-sintered multilayer body $10p_2$ to obtain multilayer body 10 sintered.

FIG. 14 is a cross section showing the step of further heating semi-sintered multilayer body $10p_2$ to obtain multilayer body 10B sintered. Further heating semi-sintered multilayer body $10p_2$ allows semi-sintered dielectric layer $11p_2$ to be sufficiently sintered to be dielectric layer 11. In doing so, Sn compound $S_2$ plays a role of a sintering aid in firing multilayer body 10B, and finally comes to exist as second phase P2 in at least some of grain boundaries GB of the plurality of crystal grains G present in external peripheral portion 13b (see FIG. 8). Further, a portion of Sn compound $S_2$ comes to be present locally at an edge portion of internal electrode layer 12 as filler F and coating C (see FIG. 10).

Multilayer ceramic capacitor 100B obtained in the above manufacturing method can have external peripheral portion 13b enhanced in strength and hence flexural strength, as has been set forth above. Further, it can also suppress migration of metal included in each internal electrode layer, and hence be enhanced in reliability. Furthermore, when filler F and coating C are conductive, internal electrode layer 12 can have an increased effective area and multilayer ceramic capacitor 100B can hence be increased in capacitance.

The step of immersing pre-sintered multilayer body $10p_1$ that is in the course of being sintered and has a porous state in a Sn compound sol preferably further includes the step of vacuuming an atmosphere surrounding the Sn compound sol after pre-sintered multilayer body $10p_1$ is immersed in the Sn compound sol. Vacuuming the atmosphere surrounding the Sn compound sol allows the Sn compound functioning as a sintering aid to be efficiently introduced into pre-sintered multilayer body $10p_1$. The vacuuming can provide a degree of vacuum up to 0.1 MPa for example. Note, however, that the degree of vacuum is not limited thereto.

As a result, external peripheral portion 13b can be enhanced in sinterability and hence strength. As a result, multilayer ceramic capacitor 100B can be enhanced in flexural strength. Further, filler F and coating C can be efficiently formed at an edge portion of internal electrode layer 12. When filler F and coating C are conductive, internal electrode layer 12 can have a further increased effective area and multilayer ceramic capacitor 100B can hence be further enhanced in capacitance.

The sol in which pre-sintered multilayer body $10p_1$ is immersed is not limited to a Sn compound sol, and a sol of a compound including at least one of Sn, Cu, Fe, Ni, Cr, Mn, V, Al and P suffices.

—Exemplary Experiment of Multilayer Electronic Component—

Tables 1 to 3 show an exemplary experiment in which multilayer ceramic capacitor 100B according to the third embodiment of the multilayer electronic component according to the present disclosure is compared with a multilayer ceramic capacitor without Sn added thereto in a process for manufacturing it.

Table 1 shows how a multilayer body varies in dimension when it is sintered, depending on whether Sn is added, that is, whether the multilayer body is impregnated with the Sn compound sol. In Table 1, "vacuumed" means that after the pre-sintered multilayer body was immersed in the Sn compound sol, an atmosphere surrounding the Sn compound sol was vacuumed to 0.1 MPa. Note that the multilayer body is designed such that the internal electrode layer has a thickness of 0.5 μm, 100 internal electrode layers are stacked, the dielectric layer has a thickness of 1.0 and the multilayer body has a thickness of 0.3 mm after it is sintered. Sn was added as follows: the pre-sintered multilayer body that had been heated to 800° C. and cooled to 50° C. in a firing furnace and subsequently ejected therefrom was immersed in a Sn compound sol including a Sn compound at a prescribed concentration. The Sn compound sol was a dispersion of an oxide of Sn in water. The multilayer body was sintered at a temperature of 1200° C.

TABLE 1

|    |             |              | lengthwise dimension (mm) | widthwise dimension (mm) |
|----|-------------|--------------|---------------------------|--------------------------|
| Sn | not added   |              | 1.053                     | 0.593                    |
|    | added       | not vacuumed | 1.025                     | 0.584                    |
|    |             | vacuumed     | 1.008                     | 0.576                    |

As can be seen from Table 1, an increased degree of shrinkage through sintering is provided by adding Sn. Further, a further increased degree of shrinkage through sintering is provided by vacuuming the atmosphere surrounding the Sn compound sol to 0.1 MPa. That is, efficiently introducing the Sn compound into the pre-sintered multilayer body can enhance sinterability.

Table 2 shows how flexural strength varies depending on whether Sn is added. External electrodes were provided on the end surfaces of multilayer bodies (see FIGS. 1 and 2) to prepare 20 multilayer ceramic capacitors as samples for measuring flexural strength. Flexural strength was measured as follows: a prepared multilayer ceramic capacitor was placed on a rigid plate and had an upper surface pressed at a center portion with a jig to measure a maximum stress that resulted in fracture, and the 20 multilayer ceramic capacitors' measurement values were averaged to calculate flexural strength. The test was conducted with multilayer bodies identical to those indicated in Table 1. Note, however, that whether vacuuming when immersing a multilayer body in the Sn compound sol has an effect is not evaluated.

TABLE 2

|                      |           | sintering temperature (° C.) |      |      |
|----------------------|-----------|------------------------------|------|------|
| flexural strength (N)|           | 1175                         | 1200 | 1210 |
| Sn                   | not added | 5.0                          | 5.1  | 6.3  |
|                      | added     | 5.5                          | 5.9  | 6.8  |

As can be seen from Table 2, adding Sn enhanced flexural strength for a sintering temperature of 1175° C. to 1210° C. That is, corresponding to enhancement in sinterability shown in Table 1, efficiently introducing the Sn compound into the pre-sintered multilayer body can enhance flexural strength.

Table 3 shows how capacitance varies with whether Sn is added. In Table 3, "vacuumed" means that after a pre-sintered multilayer body was immersed in the Sn compound sol, the atmosphere surrounding the Sn compound sol was vacuumed to 0.1 MPa. As has been described above, external electrodes were provided on the end surfaces of multilayer bodies to prepare 20 multilayer ceramic capacitors as samples for measuring capacitance. Capacitance was measured as follows: using an impedance analyzer (HP4194A manufactured by Agilent Technologies), an AC voltage of 1 Vrms having a frequency of 1 kHz was applied at a temperature of 25±2° C. to calculate an average value of the 20 multilayer ceramic capacitors' measurements.

TABLE 3

|    |           |              | capacitance (nF) |
|----|-----------|--------------|------------------|
| Sn | not added |              | 2.91             |
|    | added     | not vacuumed | 3.36             |
|    |           | vacuumed     | 4.10             |

As can be seen from Table 3, adding Sn enhances capacitance. Furthermore, vacuuming the atmosphere surrounding the Sn compound sol to 0.1 MPa enhances capacitance to a further increased degree. That is, efficiently introducing the Sn compound into the pre-sintered multilayer body can increase the internal electrode layer's effective area and thus enhance the multilayer ceramic capacitor in capacitance.

<Exemplary Experiment 1>

A multilayer ceramic capacitor was manufactured through the following procedure. Initially, a dielectric sheet and a conductive paste for an internal electrode were prepared. The dielectric sheet and the conductive paste for the internal electrode include an organic binder and a solvent. The dielectric sheet was prepared using dielectric raw material powder. The dielectric raw material powder includes $BaTiO_3$ powder.

The electrically conductive paste for internal electrodes was printed on the dielectric sheet in a predetermined pattern and an internal electrode pattern was formed on the dielectric sheet. The predetermined number of dielectric sheets for an outer layer having no internal electrode pattern printed thereon were stacked, and then, the dielectric sheet having the internal electrode pattern printed thereon was stacked on those dielectric sheets for an outer layer, and then, the predetermined number of dielectric sheets for an outer layer were stacked on that dielectric sheet. A multilayer sheet was thus produced. The multilayer sheet was pressed in a layer stacking direction by hydrostatic pressing, to thereby obtain a multilayer block. The multilayer block was cut into a predetermined size, to thereby obtain a multilayer chip. At this time, a corner portion and a ridge portion of the multilayer chip were rounded by barrel polishing. The multilayer chip was sintered, to thereby obtain a multilayer body. A sintering temperature was preferably 900 to 1300° C., depending on the materials of the dielectric layer and the internal electrode. In the present exemplary experiment as well, the sintering temperature was within this range. An electrically conductive paste for external electrodes was applied to both end surfaces of the multilayer chip and baked, and the baked layers of external electrodes were thus formed. A baking temperature was preferably 700 to 900° C. In the present exemplary experiment as well, the baking temperature was within this range. The surfaces of the baked layers were subjected to plating.

<Exemplary Experiment 2>

A multilayer ceramic capacitor was fabricated in the same manner as in exemplary experiment 1 except that before the step of sintering, a pre-sintered multilayer body heated to 800° C. and cooled to 50° C. in a firing furnace and ejected therefrom was immersed in a Sn compound sol. The Sn compound sol was a dispersion of an oxide of Sn in water. The Sn oxide's concentration was set to 7% by weight.

<Exemplary Experiments 3 to 5>

Multilayer ceramic capacitors were fabricated in the same manner as in exemplary experiment 2 except that after the pre-sintered multilayer body was immersed in the Sn compound sol the atmosphere surrounding the Sn compound sol was vacuumed to 0.1 MPa. The atmosphere was vacuumed for periods of time as indicated in Table 4.

[Measurement and Evaluation]

(1) Measuring Fine Structure of External Peripheral Portion

A sample was prepared from a multilayer ceramic capacitor through the above-described procedure, and region R4 was observed with an SEM and subjected to an elemental analysis by a WDX accompanying the SEM. Based on a result thereof, a depth of impregnation with a compound including Sn (or a thickness of a layer in which the compound including Sn is present) was determined. A distance from the sample's side or end surface to a region where the above compound was no longer present was measured at lines dividing region R4 into four equal portions in the layer stacking direction, and an average value thereof was determined as an impregnation depth. The impregnation depth was controlled by adjusting a period of time for immersion in the Sn compound sol. Table 4 indicates average concentration, which is an average of a molar ratio of the above compound to 100 mol of Ti in a region of impregnation depth. Table 4 also shows a value of "impregnation depth/ GAP amount." The GAP amount is a widthwise dimension of second margin portion M2, and it is 100 μm.

(2) Flexural Strength

Flexural strength was measured as follows: a prepared multilayer ceramic capacitor was placed on a rigid plate and had an upper surface pressed at a center portion with a jig to measure a maximum stress that resulted in fracture, and the 20 multilayer ceramic capacitors' measurement values were averaged to calculate flexural strength. A result is shown in Table 4.

(3) Reliability Evaluation

A mean time to failure (MTTF) in a highly accelerated life test (HALT) in which 6 V was applied to the multilayer ceramic capacitor at 150° C. was measured. The result is shown in Table 4. The time when IR became equal to or less than $10^4$ was determined as a failure.

<Exemplary Experiments 6 to 9>

Multilayer ceramic capacitors were fabricated in the same manner as in exemplary experiment 3 except that the Sn compound sol contained an oxide of Sn at concentrations indicated in Table 5. An exemplary experiment 8 is the same as exemplary experiment 3. The obtained multilayer ceramic capacitors were measured and evaluated in the same manner as in exemplary experiments 1 to 5. A result is shown in Table 5.

TABLE 5

| | exemplary experiments | | | |
|---|---|---|---|---|
| | 6 | 7 | 8 | 9 |
| immersion in Sn compound sol | immersed | immersed | immersed | immersed |
| concentration of oxide of Sn (wt %) | 1 | 3 | 7 | 10 |
| vacuuming time (min.) | 5 | 5 | 5 | 5 |
| impregnation depth (μm) | 43 | 47 | 51 | 55 |
| impregnation depth/ GAP amount | 0.43 | 0.47 | 0.51 | 0.55 |
| average concentration (mol %) | 0.5 | 1.2 | 2.3 | 3.1 |
| flexural strength (N) | 5.3 | 5.5 | 5.7 | 5.8 |
| MTTF (hours) | 21.6 | 22.2 | 22.0 | 23.6 |

As shown in Table 5, a higher concentration of the oxide of Sn tends to facilitate impregnation with Sn and improve flexural strength and MTTF. However, an excessively high concentration of the oxide of Sn tends to reduce flexural strength and MTTF. Therefore, the concentration of the oxide of Sn is preferably less than 15% by weight, more preferably 10% by weight or less.

The embodiment disclosed herein is illustrative and the invention according to the present disclosure is not limited to the above-described embodiment. That is, the scope of the invention according to the present disclosure is defined by the terms of the claims, and is intended to include any modifications within the scope and meaning equivalent to

TABLE 4

| | exemplary experiments | | | | |
|---|---|---|---|---|---|
| | 1 | 2 | 3 | 4 | 5 |
| immersion in Sn compound sol | not immersed | immersed | immersed | immersed | immersed |
| concentration of oxide of Sn (wt %) | — | 7 | 7 | 7 | 7 |
| vacuuming time (min.) | — | 0 | 5 | 20 | 60 |
| impregnation depth (μm) | — | 22 | 51 | 71 | 100 |
| impregnation depth/ GAP amount | — | 0.22 | 0.51 | 0.71 | 1 |
| average concentration (mol %) | — | 2.1 | 2.3 | 2.2 | 2.5 |
| flexural strength (N) | 5.0 | 5.5 | 5.7 | 5.8 | 5.8 |
| MTTF (hours) | 22.1 | 25.0 | 22.0 | 23.5 | 5.3 |

In exemplary experiment 5 having an impregnation depth/GAP amount of 1, while satisfactory flexural strength was provided, a reduced MTTF was provided. It is believed that this is because being impregnated with a large amount of Sn serving as a sintering aid provides a large difference between electrode facing portion 13a and margin portions M1, M2, M3, M4 and outer layer portions D1 and D2 in a shrinking behavior through sintering, and this results in a multilayer body being cracked, fractured or the like and moisture entering the multilayer body.

the terms of the claims. Various variations and modifications are also possible within the above-described scope.

For example, various variations and modifications are possible within the scope of the present invention, in terms for example of the number of layers of the dielectric layers and the internal electrode layers that form the multilayer body, and the materials of the dielectric layers and the internal electrode layers. Although the multilayer ceramic capacitor has been described as an example of the multilayer electronic component, the invention according to the present disclosure is not limited thereto and is also applicable to, for example, a capacitor element formed within a multilayer board.

What is claimed is:

1. A multilayer electronic component comprising:
a multilayer body including a plurality of stacked dielectric layers and a plurality of internal electrode layers interposed between adjacent dielectric layers of the plurality of stacked dielectric layers,
the plurality of stacked dielectric layers each having a plurality of crystal grains including a first phase,
the multilayer body defining an electrode facing portion where the plurality of internal electrode layers and the plurality of stacked dielectric layers face each other in a stacking direction of the multilayer body, and defining an external peripheral portion surrounding the electrode facing portion, and
only one or both of (1) a portion of the plurality of stacked dielectric layers in the external peripheral portion and (2) at a portion of the electrode facing portion immediately adjacent to the external peripheral portion having, in at least some of grain boundaries of the plurality of crystal grains therein, a second phase including at least one of Sn, Cu, Fe, Ni, Cr, Mn, V, Al, and P, and the second phase being a different compound from the first phase.

2. The multilayer electronic component according to claim 1, wherein
the plurality of internal electrode layers include at least one metal selected from Ni, a Ni alloy, Cu, and a Cu alloy, or an alloy including the at least one metal, and
the at least one of Sn, Cu, Fe, Ni, Cr, Mn, V, Al, and P is present locally in at least a portion of an edge portion of at least some of the plurality of internal electrode layers.

3. The multilayer electronic component according to claim 2, wherein the at least one of Sn, Cu, Fe, Ni, Cr, Mn, V, Al and P is also present locally in at least a portion of an interface of the edge portion of the at least some of the plurality of internal electrode layers and the adjacent dielectric layers.

4. The multilayer electronic component according to claim 1, wherein
the plurality of internal electrode layers having a first internal electrode layer and a second internal electrode layer,
the first internal electrode layer has a region facing the second internal electrode layer in the electrode facing region, a lead region reaching a first end surface of multilayer body and extending within the external peripheral portion, and
the second internal electrode layer has a region facing the first internal electrode layer in the electrode facing region, and a lead region reaching a second end surface of multilayer body opposite the first end surface and extending within the external peripheral portion.

5. The multilayer electronic component according to claim 4, further comprising:
a first external electrode on the first end surface and electrically connected to the first internal electrode layer; and
a second external electrode on the second end surface and electrically connected to the second internal electrode layer.

6. The multilayer electronic component according to claim 4, wherein the at least one of Sn, Cu, Fe, Ni, Cr, Mn, V, Al, and P is present locally in at least a portion of an edge portion of the first internal electrode layer and the second internal electrode layer in the electrode facing portion.

7. The multilayer electronic component according to claim 6, wherein the at least one of Sn, Cu, Fe, Ni, Cr, Mn, V, Al and P is also present locally in at least a portion of an interface of the edge portion of the first internal electrode layer and the second internal electrode layer and the adjacent dielectric layers.

8. A method for manufacturing a multilayer electronic component, the method comprising:
forming a pre-sintered internal electrode layer on a pre-sintered dielectric layer;
stacking a plurality of the pre-sintered dielectric layers with the pre-sintered internal electrode layer formed thereon to obtain a pre-sintered multilayer body;
immersing the pre-sintered multilayer body in a sol of a compound including at least one of Sn, Cu, Fe, Ni, Cr, Mn, V, Al and P while the pre-sintered multilayer body is in a course of being sintered; and
completing a sintering of the pre-sintered multilayer body after immersing the pre-sintered multilayer body in the sol to obtain a multilayer body including a plurality of stacked dielectric layers and a plurality of internal electrode layers interposed between adjacent dielectric layers of the plurality of stacked dielectric layers,
the plurality of stacked dielectric layers each having a plurality of crystal grains including a first phase,
the multilayer body defining an electrode facing portion where the plurality of internal electrode layers and the plurality of stacked dielectric layers face each other in a stacking direction of the multilayer body, and defining an external peripheral portion surrounding the electrode facing portion, and
only one or both of (1) a portion of the plurality of stacked dielectric layers in the external peripheral portion and (2) at a portion of the electrode facing portion immediately adjacent to the external peripheral portion having, in at least some of grain boundaries of the plurality of crystal grains therein, a second phase including the at least one of Sn, Cu, Fe, Ni, Cr, Mn, V, Al, and P, and the second phase being a different compound from the first phase.

9. The method for manufacturing a multilayer electronic component according to claim 8, wherein the pre-sintered multilayer body that is in the course of being sintered has a porous state before being immersed in the sol.

10. The method for manufacturing a multilayer electronic component according to claim 8, further comprising, before immersion in the sol:
placing the pre-sintered multilayer body in a firing furnace;
begin a firing of the pre-sintered multilayer body;
ejecting the pre-sintered multilayer body from the firing furnace while the pre-sintered multilayer body has a porous state to obtain the pre-sintered multilayer body that is in the course of being sintered.

11. The method for manufacturing a multilayer electronic component according to claim 8, wherein the at least one of Sn, Cu, Fe, Ni, Cr, Mn, V, Al, and P is present locally in at least a portion of an edge portion of at least some of the plurality of internal electrode layers.

12. The method for manufacturing a multilayer electronic component according to claim 11, wherein the at least one of Sn, Cu, Fe, Ni, Cr, Mn, V, Al and P is also present locally in at least a portion of an interface of the edge portion of the at least some of the plurality of internal electrode layers and the adjacent dielectric layers.

13. The method for manufacturing a multilayer electronic component according to claim 8, wherein
the plurality of internal electrode layers have a first internal electrode layer and a second internal electrode layer,
the first internal electrode layer has a region facing the second internal electrode layer in the electrode facing region, a lead region reaching a first end surface of multilayer body and extending within the external peripheral portion, and
the second internal electrode layer has a region facing the first internal electrode layer in the electrode facing region, and a lead region reaching a second end surface of multilayer body opposite the first end surface and extending within the external peripheral portion.

14. The method for manufacturing a multilayer electronic component according to claim 13, further comprising:
forming a first external electrode on the first end surface so as to be electrically connected to the first internal electrode layer; and
forming a second external electrode on the second end surface so as to be electrically connected to the second internal electrode layer.

15. The method for manufacturing a multilayer electronic component according to claim 13, wherein the at least one of Sn, Cu, Fe, Ni, Cr, Mn, V, Al, and P is present locally in at least a portion of an edge portion of the first internal electrode layer and the second internal electrode layer in the electrode facing portion.

16. The method for manufacturing a multilayer electronic component according to claim 15, wherein the at least one of Sn, Cu, Fe, Ni, Cr, Mn, V, Al and P is also present locally in at least a portion of an interface of the edge portion of the first internal electrode layer and the second internal electrode layer and the adjacent dielectric layers.

17. The method for manufacturing a multilayer electronic component according to claim 8, further comprising vacuuming an atmosphere surrounding the sol after the pre-sintered multilayer body is immersed in the sol while in the course of being sintered.

* * * * *